un009079109B2

(12) United States Patent
Buhler (10) Patent No.: US 9,079,109 B2
(45) Date of Patent: Jul. 14, 2015

(54) ELECTRONIC REACH ENVELOPE INTRUSION EXAMINER

(71) Applicant: DISNEY ENTERPRISES, INC., Burbank, CA (US)

(72) Inventor: Peyton B. Buhler, Burbank, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 149 days.

(21) Appl. No.: 13/971,297

(22) Filed: Aug. 20, 2013

(65) Prior Publication Data

US 2015/0055124 A1    Feb. 26, 2015

(51) Int. Cl.

| G01N 21/00 | (2006.01) |
|---|---|
| G01C 3/08 | (2006.01) |
| G01C 3/20 | (2006.01) |
| A63G 7/00 | (2006.01) |
| B60Q 1/00 | (2006.01) |
| B60W 30/16 | (2012.01) |
| B61K 9/08 | (2006.01) |
| B61L 23/04 | (2006.01) |

(52) U.S. Cl.
CPC ............... *A63G 7/00* (2013.01); *B60Q 1/0023* (2013.01); *B60W 30/16* (2013.01); *B61K 9/08* (2013.01); *B61L 23/041* (2013.01)

(58) Field of Classification Search
CPC ...... G01C 21/16; G06F 3/0346; G01S 17/023
USPC .............. 356/4.01, 11, 5.01; 246/166; 104/53
See application file for complete search history.

(56) References Cited

U.S. PATENT DOCUMENTS

| 4,969,096 | A | * | 11/1990 | Rosen et al. .................. 434/112 |
|---|---|---|---|---|
| 5,786,750 | A | * | 7/1998 | Cooper ..................... 340/425.5 |
| 6,120,235 | A | * | 9/2000 | Humphries et al. .......... 414/563 |
| 6,999,849 | B2 | * | 2/2006 | Bridges ......................... 700/245 |
| 7,163,227 | B1 | * | 1/2007 | Burns .......................... 280/638 |
| 2009/0272289 | A1 | * | 11/2009 | Baker et al. .................... 104/76 |
| 2012/0222579 | A1 | * | 9/2012 | Turner et al. ..................... 104/2 |
| 2014/0025284 | A1 | * | 1/2014 | Roberts ......................... 701/300 |

* cited by examiner

*Primary Examiner* — Michael A Lyons
*Assistant Examiner* — Hina F Ayub
(74) *Attorney, Agent, or Firm* — Marsh Fischmann & Breyfogle LLP; Kent A. Lembke (57) ABSTRACT

A system for examining intrusions of a physical environment into a reach envelope of a vehicle traveling along a length of track. The system includes a test skid including a chassis with front and rear wheel assemblies each adapted for rollably engaging the track. The test skid may further include a laser measuring scanner supported on an upper surface of the chassis and adapted for scanning a vertical plane orthogonal to a longitudinal axis of the chassis to measure a plurality of distances between the laser measuring scanner and surfaces of the physical environment when the test skid moved along the track. The system also includes a test controller executing an examination program to determine a real world envelope based on the measured distances from the laser measuring scanner and to determine intrusions by comparing a reach envelope for the vehicle with the determined real world envelope.

12 Claims, 10 Drawing Sheets

ELECTRONIC REACH ENVELOPE INTRUSION EXAMINER

BACKGROUND

1. Field of the Description

The present description relates, in general, to methods and systems for use in determining a safety envelope about a moving object, and, more particularly, to methods and systems for use in designing amusement park rides so as to maintain a predefined reach envelope about a ride vehicle as it moves along a ride path (e.g., moves along a length of track or along a defined path for a trackless attraction).

2. Relevant Background

With any amusement park ride, safety is one of the most important design parameters. Particularly, amusement park rides that involve a passenger vehicle rolling along a track, or along a ride path for a trackless attraction, typically are designed to maintain a safety envelope about the vehicle along the entire length of the track. For example, safety standards set by a park operator or industry groups may define a reach envelope for rides that define the amount of space that is free of obstacles (e.g., set or theme elements) about the vehicle. This space or volume is often labeled a "reach envelope" (or passenger reach clearance envelope) and may be thought of as defining a distance from a typical passenger position that should be free of any object that may be contacted or "reached" by a passenger as the vehicle carrying the passenger passes along the track.

Each ride may have a different reach envelope definition, and a single ride may be designed so that different reach envelope definitions may apply along differing portions of the ride track or along differing portions of the ride path. For example, a dark theme ride may be designed with a track that winds itself through a themed environment or set at a relatively slow pace, and the reach envelope may be relatively small as even if contact is made the danger is comparably low. In contrast, a roller coaster may have stretches of track where the vehicle is moving at very high speeds, and a much larger reach envelope may be used for these stretches of track. Further, the same roller coaster may have stretches where the speed is reduced and, likewise, the reach envelope may be smaller in these portions of the ride. Further, the vehicle (or seat) design and/or the passenger restraint design may vary so as to allow different amounts of passenger movements (e.g., a shoulder restraint may make it difficult for a passenger to reach outward from a vehicle while a lap restraint may allow a significant amount of passenger movement). These differing vehicle and/or restraint designs may then be paired with differing reach envelopes, with a smaller envelope used when the passenger is more restrained from reaching outward and so on.

Further, a ride designer may wish to apply a number of reach envelopes to the same stretch of track or a ride path and then let differing "obstacles" be present (or absent) in each envelope. For example, a first envelope may be associated with a small or no reach situation (the envelope defines a relatively small distance about the vehicle), a second envelope may be associated with a passenger gently trying to reach out, and a third envelope may be associated with the passenger really trying hard to reach out (e.g., a teenager may push hard to intentionally try to contact a nearby obstacle). The ride may set or use differing envelopes based on the ride's intended passengers.

In other cases, though, the ride designer may allow "soft" obstacles within the smaller or no reach envelopes such as a cloud of smoke, a spray of water, a curtain, and so on while harder obstacles may only be provided in larger envelopes or, more often, must be placed to be outside of the reach envelopes. The "allowables" or what items can be provided in an envelope typically will vary with the speed of the vehicle along the track. In other words, the ride is designed to provide a physical safety zone around each of the passengers while they are moved through an attraction or ride in a vehicle. This is to protect them from coming into contact with an object that may be harmful. Depending on the passenger's speed relative to the object as well as its distance from the passenger, certain classifications of items can be allowed or disallowed in the region or physical safety zone. With speed, distance, and classification of the object (whether it is hazardous (e.g., hard, sharp, or the like) or benign (soft, rounded, water, smoke, or the like), the ride designer can determine whether the object is allowed in the zone or space about the vehicle.

Presently, reach envelope testing or checking is a very cumbersome and inefficient process. One method of checking reach envelopes involves attaching a large wooden template in the shape and size of the clearance envelope to a ride vehicle, e.g., a planar piece of wood may be attached to the center of the vehicle and arranged to be orthogonal to the direction of travel for the vehicle. Then, the vehicle is slowly moved, such as via a winch, through the ride or attraction. When the physical template hits an object, the vehicle is stopped on the track, and the inspectors (which may include the ride designer) visually assess the intrusion into the envelope. This may involve determining whether the object may be within the envelope (an "allowable") or whether the object needs to be removed (e.g., cut away a volume of a tunnel or cave wall for a roller coaster, remove a scenery piece in a dark ride, or the like).

There are a number of problems with using such a reach envelope process to check the design of ride as it is being built. The process is slow and cumbersome in part because the templates are large and they obstruct workers' movements and line of sight around the vehicle. Further, since there are different sizes of clearance zones, the process has to be repeated with different sizes and/or shapes of the templates on the vehicle or the template has to be changed out along differing portions of the track. The current technique also requires the actual ride vehicle to be winched around the track, and the vehicle may weigh several tons such that this can be a challenging process to perform safely in a reasonable amount of time.

SUMMARY

The present description teaches a system (and corresponding method) for examining intrusions or clashes within a reach envelope. The system eliminates the use of large physical templates and even the use of an actual ride vehicle (i.e., ride vehicle is not needed for a pull through test). The system may be thought of as an electronic reach envelope intrusion examiner.

The system provides a number of advantages over the prior clearance envelope checking method. A test skid is used that rides on a ride track or ride path such that the actual ride vehicle is not needed, and this frees up vehicle resources (whereas the ride vehicle had previously been out of commission during the test). The skid may be configured for use on multiple ride tracks with minimal adjustment (e.g., not limited to use on one track as is case with an actual ride vehicle). With the envelope check system, there is no need to bolt or mount physical wooden templates onto a ride vehicle, and the templates do not need to be changed out during the pull through or test run (e.g., for low speed, middle speed, and high speed portions of the track). With the template eliminated, there are no (or fewer) physical obstructions to hinder workers (test operators). The system can perform the envelope intrusion examination or test much quicker than the pull-through process, and repeated tests may be easily performed. The system is more accurate in identifying the intruding or clashing areas or objects. The system is also much safer to use for envelope intrusion examination than a process that involves winching an actual or potential ride vehicle that may weigh several tons through a ride or attraction.

More particularly, a system is provided for examining intrusions of a physical environment into a reach envelope of a vehicle traveling along a length of track. The system includes a test skid including a chassis with front and rear wheel assemblies each adapted for rollably engaging the track. The test skid may further include a laser measuring scanner supported on a surface of the chassis and adapted for scanning a vertical plane orthogonal to a longitudinal axis of the chassis to measure a plurality of distances between the laser measuring scanner and surfaces of the physical environment when the test skid moves along the track. The system also includes a test controller executing an examination program to determine a real world envelope based on the measured distances from the laser measuring scanner and to determine intrusions by comparing a reach envelope for the vehicle with the determined real world envelope.

In some implementations, the examination program generates a location and size of the reach envelope based on a reach envelope definition and on data defining geometry of the vehicle including locations of passenger seats. In the same or other implementations, the test skid further includes degrees of freedom mechanisms (hinges, turntable, rotating shafts, and the like) on the chassis providing yaw, roll, and pitch movements of the chassis as the test skid moves along the length of the track. The test skid may include a sensor associated with each of the degrees of freedom mechanisms measuring amounts of the yaw, roll, and pitch movements. Then, the examination program may determine geometry of the track based on the measured amounts of the yaw, pitch, and roll movements, and the examination program may then generate the location of the reach envelope based on the determined track geometry. Often, it is useful for the degrees of freedom mechanisms to be positioned on the chassis at locations corresponding to locations on the vehicle that provide yaw, roll, and pitch movements for the vehicle.

In some cases, the test skid further includes a track gauge adjustment mechanism for adjusting a width between wheel assemblies on the chassis. Additionally, the test skid may further include a mechanism for adjusting a length of the chassis to set a wheelbase length for the test skid within a range of lengths. Still further, the front and rear wheel assemblies may be configured for adjusting relative position between first and second wheels to adjust a track diameter receivable by the wheel assemblies. It is often useful for the laser measuring scanner to further include a visible light laser. Then, the examination program may selectively (pulsing) operate the visible light laser during scanning by the laser measuring scanner to trace a location of the intrusions in the physical environment with visible laser light, whereby the visible and invisible laser light are projected or emitted in the same plane.

DETAILED DESCRIPTION

The present description is directed toward methods and systems for electronically examining reach envelope intrusion as may be useful in designing a new amusement park ride or determining whether modifications to environs of a ride comply with one or more reach envelopes.

In some embodiments of the system, a ride's track is utilized to perform the testing or examining of an envelope for intrusions but the actual vehicle is replaced with a test skid. In other cases, though, there is no "track" with the system running along a predetermined ride path without track rails, and these embodiments are considered within the scope of the present description. Many ride tracks such as those provided for roller coasters cause a vehicle to have relatively complicated movements such as with roll, pitch, and yaw, which made the use of an actual ride vehicle desirable in prior systems. However, the test skid is adapted to have similar freedom of movement as the actual ride but to be much lighter and to have a low profile.

To this end, the test skid may include a small chassis that has roll, pitch, and yaw degrees of freedom. The chassis may be adapted to have the same degrees of freedom at the same points (in chassis/frame and wheels) as the vehicle intended for use in a ride, but, in other cases, the same points to not need to be used as long as it correctly measures the track (or ride path) roll, pitch, and yaw. The chassis may be adjustable to accommodate its use on tracks with rails of differing shape and/or size and/or with differing spacing between the rails (e.g., an adjustable width chassis). The chassis may also be adjustable in length to mimic a range of vehicle lengths (e.g., various ride vehicle wheelbases) as it is desirable to simulate the complex movement of an actual ride vehicle on a track with the test skid so as to more accurately examine envelopes that would occur during use of the ride.

The "universal" skid functions to characterize the track at any point along its length (geometry of the track), which is needed or useful for determining the reach envelope at that point by providing proper chording as would the actual ride vehicle. Chording of a vehicle as it moves along a track that is not merely a horizontal/flat and straight track causes the envelope to move as the vehicle (or the test skid) moves along the track. The test skid mimics the movement of a vehicle along the track by, in part, replicating the chording of the vehicle in the ride/attraction.

The system further includes one or more scanners mounted upon the skid that functions to measure the physical environment adjacent to the skid. For example, a laser measurement system or scanner (or multiple scanners) may be mounted upon an upper surface or portion of the chassis of the skid such as midway between the front and back wheel axes (as this is a typical location of maximum chording). The laser measurement scanner may be positioned such that it scans a vertical plane (e.g., 180 to nearly 360 degree scan) that is orthogonal to the direction of travel of the skid or that is orthogonal to a longitudinal axis of the skid chassis (e.g., scans a plane that is coincident with plane of physical template in prior envelope checking systems). The output of the scanner(s) is a definition of the real world envelope or size of a void or space as measured in a plane (such as a perpendicular plane) at a particular time, and, as the skid is moved along the track, a volume is defined through which a ride vehicle will pass as it travels along the track. In other words, the scanner acts to measure a set of distances to the nearby or adjacent physical environment along the track carrying the test skid and the mounted scanner.

The system further includes a processing unit (e.g., a computing device or computer) that executes one or more envelope intrusion examination programs. The examination program(s) processes the data from the laser measurement scanner and from sensors on the chassis (e.g., sensors providing data regarding roll, pitch, and yaw of the skid to obtain track geometry information) to determine the size and location (orientation relative to the track) of the real world envelope at each point or location along the track over which the skid is moved (pulled, pushed, or self-propelled). The examination program may retrieve from memory/data storage one or more definitions of reach envelopes, and then overlay the reach envelope(s) onto the real world envelope to identify whether or not there are any clashes or intrusions into the envelope. When there are clashes/intrusions, the examination program may further act to determine a severity of the clash (e.g., which of two or more envelopes is intruded upon by an object, penetration maximum depth and width) as well as the location of the clash/intruding object(s).

The system may include one or more output devices for presenting the results of the envelope intrusion examination provided by the examination program. For example, an intrusion identification system/mechanism may be included that allows an operator to quickly visualize where the intrusion/clash is located. This may involve use of a visible laser identification system that directs visible light onto an intruding/clashing object (or surface of an object) within one or more of the reach envelopes. The visible laser identification system may be packaged within the same housing as the laser measurement scanner and be operated to turn on during rotation of the scanning laser so as to trace clashes (or regions of a physical object in the environment or real world envelope determined to be within the reach envelope). The benefits of such an arrangement include the visible laser projecting along the same exact plane as the non-visible measuring laser.

In some implementations of the system, a set of laser measuring scanners are placed on a chassis, which in combination provides a test skid. The skid is placed on the ride track, and the chassis is configured to have sufficient roll, pitch, and yaw degrees of freedom to adequately rest on the track, which is especially useful for roller coasters or other rides that include compound curves. Position sensors are aligned on the chassis with the roll, pitch, and yaw axes on the skid, and there output can be used by the examination program to accurately characterize the instantaneous geometry of the track over which the skid is rolling. The laser measuring scanners scan the actual physical environment in a perpendicular plane about the skid, and the output of the scanner is the distances to all objects in the scanner's plane.

The user/operator inputs to the examination program the ride vehicle geometry that correlates the ride vehicle wheel carrier position to the theoretical or defined reach envelopes. The user/operator also inputs to the examination program the geometry that correlates the skid wheel carrier position to the laser scanner position(s). With this information, the examination program performs mathematical transforms to virtually reposition the clearance envelope geometry (e.g., as defined by industry or safety standards or by a ride designer) in 2D space and compares this repositioned clearance envelope with the actually measured environment (or real world clearance envelope). The examination program then performs a clash detection to identify intrusions into the clearance or reach envelope.

An output device may audibly and/or visually identify the intrusions and their locations in the real world environment (such as in a graphical user interface (GUI) on a monitor linked (wired or wirelessly) to the processing/computing unit running the examination program). This may involve audible notification, a visible light indicating which zone or envelope was breached, and/or a laser pointing to the actual intruding object. The GUI or screen of the output device may display a graphical representation of the clearance envelope with the location of the offending/breaching object highlighted or otherwise shown, and data such as linear distances indicating a magnitude of the intrusion into the reach envelope may also be displayed on the GUI or screen. The operator may determine what the object is along the track and, depending on which of the clearance zones in which the object intrudes, may determine whether the object needs to be removed or moved.

Figure 1:
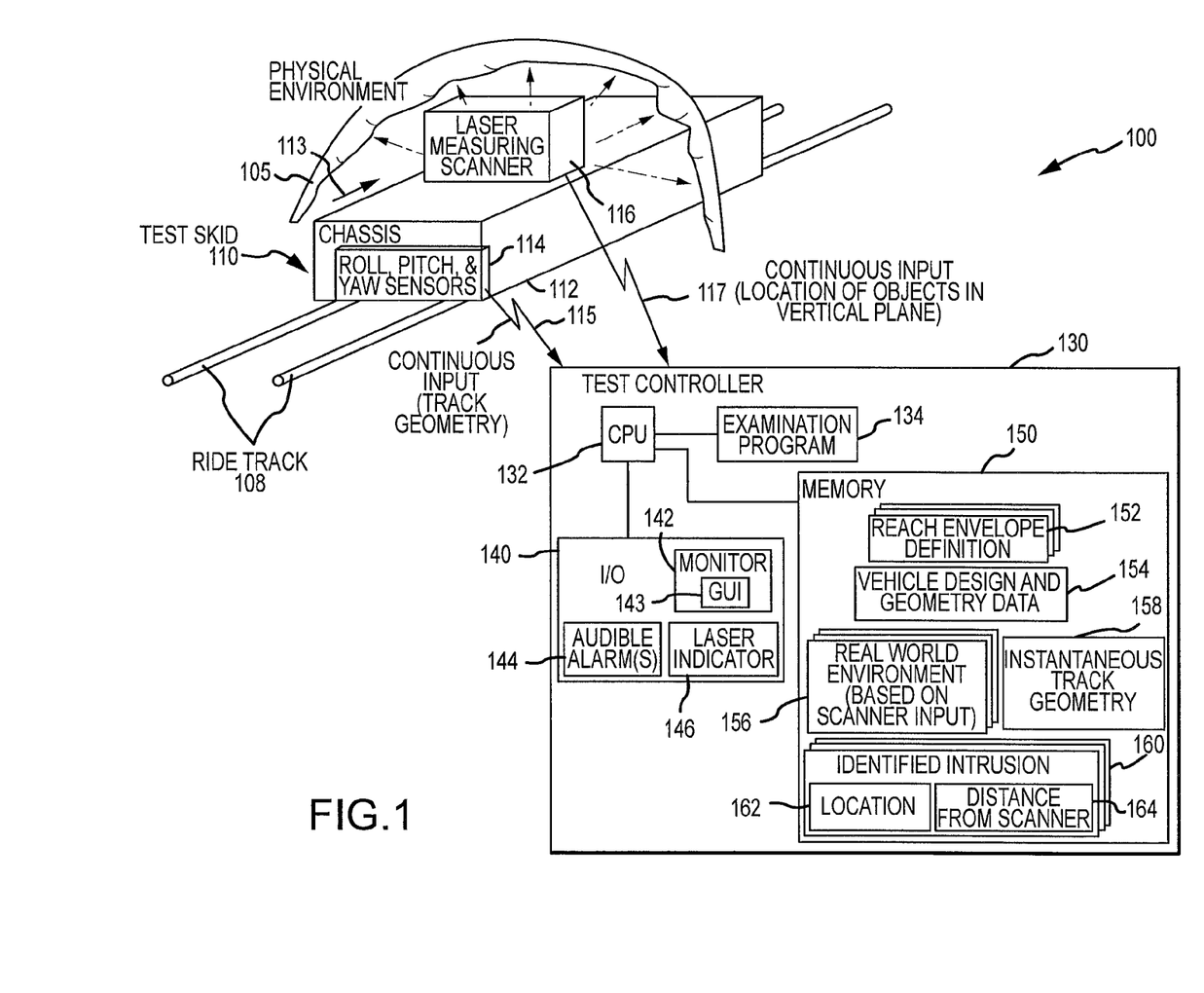
FIG. 1 is a functional block diagram of a reach envelope intrusion examination system of one embodiment of the description.

FIG. 1 illustrates a functional block diagram of a reach envelope intrusion examination system 100 of one embodiment of the present description. The system 100 may be used by a ride designer to determine whether a safety or reach clearance envelope(s) has been provided along lengths of a newly designed ride or one that has been modified (such as by replacing adjacent scenery or thematic elements with new objects that may have been placed too near the track and need moving or removal). The examination system 100 may be thought of as including a physical environment and its objects 105 that are provided for a ride or attraction, and the track 108 (e.g., often two side-by-side and spaced apart rails) that are used to define a ride path for a passenger vehicle through the physical environment 105 (e.g., through tunnels or corridors defined by the walls and ceilings of the environment 105).

The system 100 further includes a test skid 110 that is configured for riding on the ride track 108 and a test controller 130 for processing test/examination data 115, 117 and providing examination output (e.g., identified intrusions 160 into defined reach envelopes 152) to a system operator. The system 100 may also include input devices (client computers) to allow operators to enter or input predefined data sets 152, 154, but these components are not required to implement the system 100 as long as the data 152, 154 is available and/or stored in memory/data storage 150.

To understand the components and design of the system 100, it may be useful to first look at what information is needed or desired to perform an examination of intrusions of physical objects into virtual reach envelopes provided for safety about a passenger vehicle on a tracked ride. First, the examination data should include information on the real world environment along the ride track 108. For example, this data may define where wall or ceiling surfaces are relative to the track 108 and a vehicle passing along the track 108 and the data may show where objects such as set or scenery pieces are positioned in the physical environment. To obtain this data on the physical environment 105, the system 100 includes a scanner assembly 116 mounted on the chassis 112 of the skid 110. During operation of the system 100, the skid 110 is caused to move, either with external devices such as a winch or by self-propulsion in some cases with an onboard drive system, along the length of the track 108 as shown with arrow 113. The scanner assembly 116 operates on an ongoing basis to scan (as shown with dashed lines/arrows in FIG. 1) the surrounding space to collect data that is transmitted (e.g., in a wired manner or wirelessly) to the test controller 130 as shown at 117.

In one particular implementation of the system 100, the scanner assembly 116 includes at least one laser measuring scanner that is operable to continuously scan a plane (e.g., 180 to 270 or even nearly 360 degrees). If there are blind spots caused by the skid, two or more scanners may be used in the same plane to "see around" the blockage caused by the skid. In preferred implementations of the skid 110, the laser scanner 116 is positioned such that it operates to scan within a plane that is orthogonal (or at least transverse) to a longitudinal axis of the chassis 112. This would be a vertical plane that is similar in location and orientation as that provided by the prior physical templates. The laser scanner 116 may be positioned at a midpoint between the front and back wheel axes of the skid in some cases while other implementations may position the laser scanner 116 so as to coincide with expected positions of passengers of vehicle modeled by the skid 110 such as a scanner in each seat row such that scanning is performed in locations correlating with seated passengers (when more than one scanner 116 is used and the passenger vehicle has more than one row of passenger seats).

The laser scanner 116 is placed on the top surfaces of the chassis 112 and the skid is configured to provide an unobstructed "view" for the scanning laser light (or at least about 180 degrees of unobstructed view). The scanner measures the distances to physical objects in the environment 105 in each orthogonal plane along the ride track 108 and passes 117 this data to the test controller 130. A variety of laser scanners may be used that each will have a range or field of scanned measurement that is greater than the largest of the reach envelopes (e.g., to be able to measure distances to any possible intruding object in such an envelope such as a range of 20 feet when the envelope has a diameter of 10 feet or the like). In one prototype implementation a LMS100 laser measurement system distributed by SICK Sensor Intelligence was used with a scanning field of about 270 degrees and maximum range of 20 meters. This scanner 116 uses a rotary mirror with a position encoder to provide the data 117 to accurately define the distance to each part of the physical environment in each orthogonal plane or slice of space along the ride track 108 traveled 113 by the test skid 110.

Second, the examination data processed by the test controller 130 should include the passenger reach envelope or envelopes that are to be provided about a vehicle on the track 108 and that are being examined for intrusion by the physical environment 105. To this end, the test controller 130, which may take the form of a computer or computing device, is shown to include a processor 132 that executes code or software (which may be provided in a computer-readable medium) to provide the examination program 134. As explained below, the examination program processes data 115, 117 from the skid 110 along with user input 152, 154 to determine a real world environment 156 (based on scanner input 115, 117), to determine the instantaneous track geometry 158 (e.g., based on the vehicle design and geometry data 154), and to identify intrusions 160 based on a comparison of the real world environment/location of physical objects in each scan plane and the corresponding reach envelope 152 at that location. The identified intrusions 160 will be defined so as to provide their locations (e.g., angular location scanned by the laser) 162 and their distance from the scanner 164.

The test controller 130 includes memory/data storage 150 that is managed by the processor 132 and used to store a reach envelope definition 152 for each point along the length of the ride track 108. The same envelope definition 152 may be used for the entire track or two or more may be used (e.g., each envelope associated with speed range anticipated for a vehicle on the track 108 at differing sections of the track 108). Further, the reach envelope definitions 152 may provide one to four or more envelopes at each location or point along the track 108, and such envelopes may define different passenger clearance envelope zones about a passenger vehicle on the track 108. Different envelopes 152 may be used, for example, to determine whether an object can intrude into that zone based on the characteristics of the object and the rules for that envelope 152. For example, intrusion by a smooth object may be allowed in some of the envelopes 152 while a sharp object may be allowed in a limited number of envelopes 152 (e.g., associated with very low speeds of the vehicle). Each of the envelope definitions 152 are, hence, associated with a location on or section of the track 108 such that the real world envelope 156 at a track location can be compared with one or more of the envelope definitions 152. The definitions 152 may be standard envelopes for the industry or a park ride designer/operator or may be set/chosen by the operator of the system 100, and, often, the reach envelopes 152 are defined by a radius value with this radius measured from vehicle seat bottoms (although this is not required to practice the system 100).

Since the envelope definitions 152 are related to the vehicle and its seats, a third portion of the examination data used by the system 100 is vehicle design and geometry data 154. This data 154 typically is provided by a user or operator of the system 100 and may be thought of as a predefined data set that typically will not change for a particular run of the system 100 to inspect reach envelope intrusions. The vehicle geometry and design data 154 may include the locations of passenger seats (and the bottom of seats) within a vehicle body, and it further may define the bogies or wheel arrangement to allow the seat locations and movements relative to a track 108 to be determined. Briefly, the data 154 defines the passenger positions in relation to the track 108.

A fourth portion of the examination data then is the track geometry 158 such as vertical and horizontal curves, banking, and the like. This data is needed because changes in the track 108 cause the vehicle riding on the track 108 to move in different ways and to position the passenger seats (and passengers of the vehicle) in different positions relative to the track 108 and the surrounding environment 105. Hence, the test controller 130 and the examination program 134 take as input the geometry 158 (as determined from input 115) of the track 108 at each location being scanned by the scanner 116 so as to be able to determine where to place the defined reach envelope(s) 152 relative to the track 108 and real world environment 154. To this end, the test skid 110 is shown to include sensors 114 that collect data useful for determining the geometry 158 of the track 108 on the fly (as the skid 110 moves 113 along the track 108), and this data 158 is transmitted to the test controller 130 as shown at 115. In some embodiments, the sensors 114 include sensors for determining roll, pitch, and yaw, and these sensors 114 may be positioned at locations on the chassis 112 that coincide with corresponding degrees of freedom for the chassis 112 and of the vehicle body that the chassis 112 is simulating in the test system 100.

With these four part of the examination data in hand, the examination program 134 operates at each point along the track 108 to determine identified intrusions 160 (their locations 162 and their distances 164 from the scanner 116). The test controller 130 then acts to provide continuous or nearly continuous output to a system operator to allow them to determine in real time whether an intrusion exists along the track 108 and whether or not corrective actions should be taken to remove or modify the intruding portion of the physical environment. As shown in FIG. 1, the processor 132 may manage operation of input/output devices 140 that may provide the output of the examination program 134 (e.g., identify intrusions 160).

For example, a monitor 142 may be provided in the test controller 130 and be operated (by the program 134 or another program) to present a graphical user interface (GUI) 143. This GUI 143 may display light indicators showing whether or not an intrusion has been detected at a present location of the skid 110 on the track 108 and, if so, which envelope has been intruded (e.g., display a light with a color corresponding to each envelope when that envelope has been intruded by an object of the environment 105). The GUI 143 may also be used to display a visual representation of the reach envelope(s) defined by data 152 along with the real world envelope 156 and any identified intrusions 160. Further, audible alarms 144 may be used by the examination program 134 to alert an operator to an intrusion (with differing audible sounds/noises used for different envelopes 152 in some cases). Still further, a light or laser indicator may be used to visually "mark" an intrusion (or its exposed surfaces) in real time. For example, a laser providing visible laser light may be provided with the scanner 116 and be operated by the examination program 134 to project visible light onto intruding portions of the environment 105 upon their detection (e.g., skid 110 moved along until detect intrusion and then moved more slowly or held in place along the track 108 to trace a clashing surface of the environment 105 to allow its removal and to verify enough material (e.g., of a set piece wall/ceiling) has been removed to eliminate the intrusion).

Figure 2:
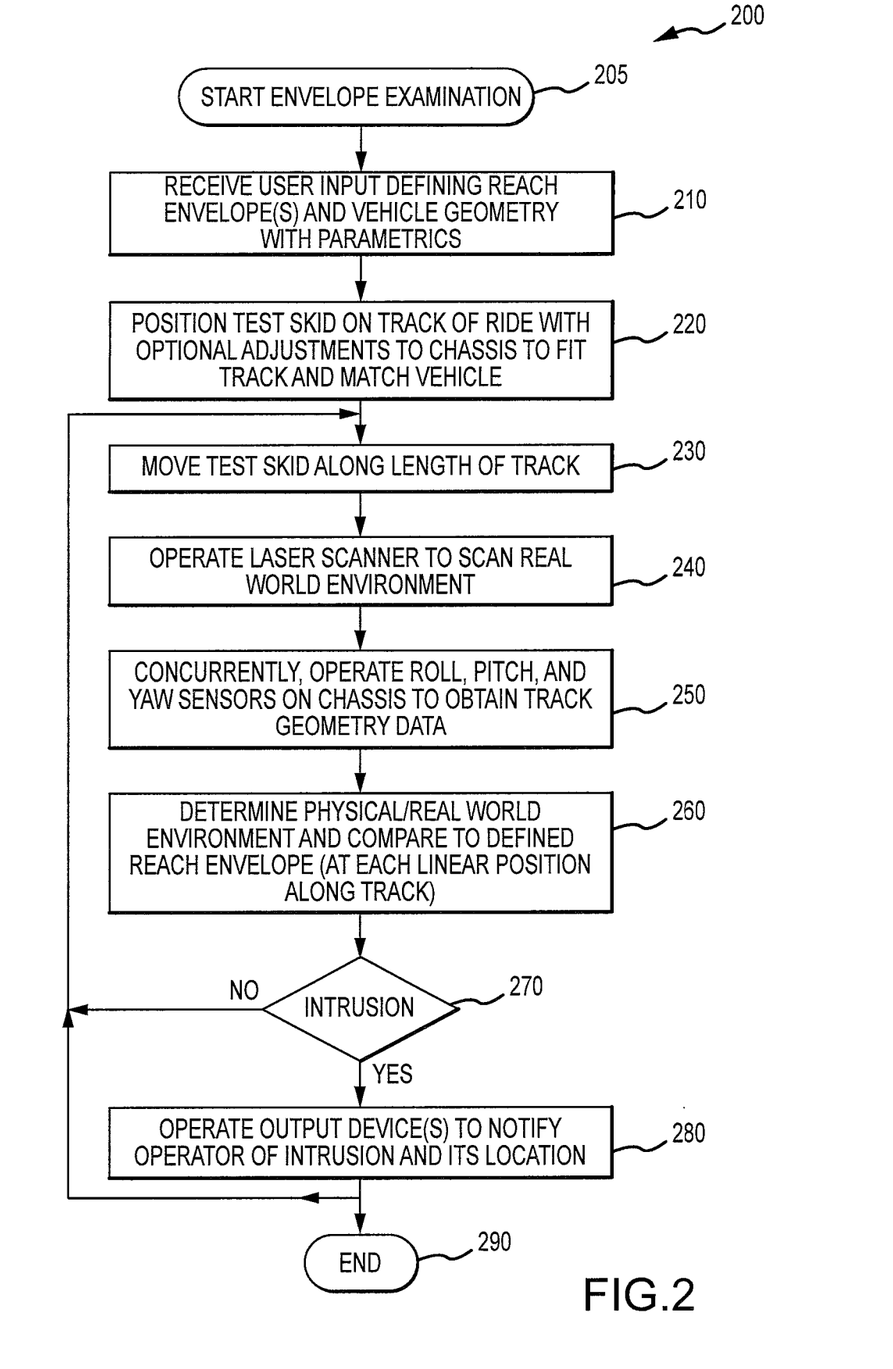
FIG. 2 is a flow diagram of a method for examining for intrusion or clashes within a reach envelope(s) of a ride.

FIG. 2 illustrates a method of examining for intrusions into a reach envelope along a ride track as may be carried out by operation of the system 100 of FIG. 1. As shown, the method 100 starts at 205 such as with the fabrication or purchase of a test skid that is adapted to or adaptable to ride on a particular ride track and to have degrees of freedom, size, and length similar to or even nearly identically matching those of the actual ride vehicle to be used in a ride or attraction. Further, the test skid is equipped with roll, pitch, and yaw sensors (as needed) and with a scanner adapted to obtain measurements to objects in a physical environment about the periphery of the skid (or to perform an angular scan of 180 degrees or the like from a fixed point on the chassis of the skid).

The method 200 continues at 210 with receiving or retrieving user input defining reach clearance envelopes for use in the examination for intrusions. Further, at 210, user input is received or retrieved from memory that defines the vehicle geometry for use in the examination 200 (e.g., seat locations, frame geometry of the vehicle body, and location of wheels/bogies used to ride on track). At step 220, the method 200 continues with positioning the test skid on the ride track of the ride, and, if needed, this step may involve adjusting the chassis and/or its wheel/bogie assemblies to fit the track (gauge and rail size) and to match the actual passenger vehicles to be used on the ride/attraction. For example, this may involve adjusting the length of the chassis to match the wheelbase (distance between axles) of the actual ride vehicle.

At step 230, the method 200 continues with moving the test skid along the length of track at some predefined test/examination speed. Then, at 240, the laser scanner is operated to scan the real world environment, such as in a vertical plane from a location on top of the chassis of the test skid, to determine or measure distances from the scanner and skid chassis to objects in the surrounding physical environment. Concurrently, step 250 is carried out including operating roll, pitch, and yaw sensors on the chassis to obtain data useful for defining the track geometry at the location of the skid and the supported laser scanner.

At 260, the method 200 continues with determining (with the examination program) the physical or real world environment based on the scanner data and knowledge of the skid geometry and location of the laser scanner on the skid chassis. Step 260 also includes comparing the determined real world environment with a defined reach envelope at this location or section of track. Step 260 may involve comparing the scanned cross section (of the volume of space adjacent to the track) with an instantaneous reach envelope, which may have its position/orientation changed to suit the vehicle geometry, user input defining the envelopes, and sensor input regarding the track geometry (all this data is used to set where the reach envelope is at this point along the track).

At step 270, the method 200 includes determining whether or not there is an intrusion by the real world environment into the reach envelope(s) based on the comparison of step 260. If not, the method 200 continues at step 230 with moving the test skid. If an intrusion is found, at 280, the method 200 continues with operating the output devices of the test controller to notify an operator of the identified intrusion and its location in the physical environment. This may involve using light to mark/trace the actual intrusion, sounding audible alarms, operating indicator lights, and/or displaying a mapping of the physical environment to the virtual or defined reach envelope at the present location of the skid (or a past location of the skid in some cases as the data may be stored for later processing and use by an operator to evaluate intrusions and proper corrective actions). The method 200 may end at 290 or continue at step 230 with further movement of the skid along the ride track.

With the system 100 and method 200 understood, it may be helpful to more generally describe the techniques or system logic used to obtain a dynamic reach envelope for a tracked ride or a trackless attraction. Basically, if one wants to know or determine the relationship between the real world environment and the fingertips of a vehicle passenger, this can be determined by finding the relationship between smaller subcomponents. The following listing describes the different relationships of values (or subcomponents) and whether the values are known values (e.g., a simple one time measurement) or are variables (e.g., the continuously changing track geometry) or are a parameterized equation(s).

For example, the relationship between the real world environment and each scanner may be defined with a dynamic variable, and this variable's value may be obtained from scanner measurement data that may be updated on a frequent (nearly continuous) basis. As another example, the relationship between a scanner and the skid may be defined with a static variable whose value(s) can be obtained from a measurement of the scanner location from the skid origin (i.e., manually measured and provided as input once per test). The relationship between the skid and the skid wheels is defined by equation (based on the track geometry), and the equation can be solved in part based on data from the skid sensors and may be updated nearly continuously. The relationship between the skid wheels and the track is typically a dynamic variable, based on track geometry, and its value may obtained from skid sensors (again frequently to continuously updated). The relationship between the track and the vehicle wheels is defined as a dynamic variable based on track geometry, and its values may be obtained on a nearly continuous basis from data provided by the skid sensors. The relationship between the vehicle wheels and the vehicle chassis is defined typically by an equation (based on track geometry) that is solvable with data from the skid sensors on a nearly continuous basis. Further, the relationship between the vehicle chassis and the seat(s) may be defined by a static variable obtained based on vehicle geometry, and this variable may be manually measured/input once per test. Finally, the relationship between a seat and the fingers of the passenger sitting in that seat is a static variable obtained by a defined reach envelop (again, input or set manually once per test in most cases).

Figure 3:
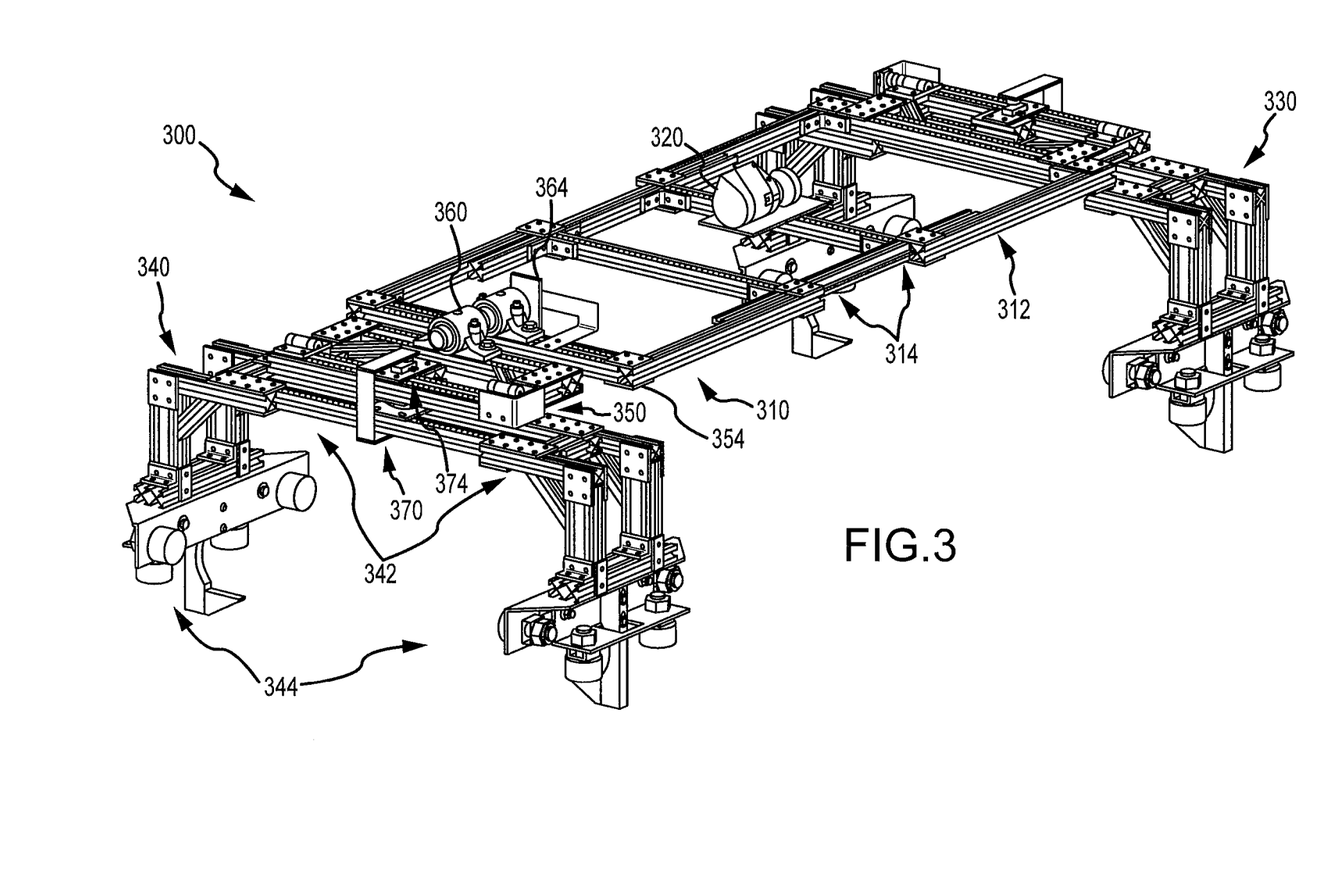
FIG. 3 is a perspective side view of a test skid shown to be supporting laser measuring scanners prior to mounting on rails of a ride track.

As discussed above, it is desirable for a test skid to be provided that can be used in place of an actual ride vehicle. A number of forms of such a skid may be envisioned, but FIG. 3 illustrates one embodiment of a test skid 300 that may be used in a reach envelope intrusion examination system of the present description. The test skid 300 includes a chassis 310 having an elongate frame 310 with a front wheel axis assembly 330 at one end and with a rear wheel axis assembly 340 at the other end. The frame 312 is substantially planar to be light and avoid presenting high profile features that would block workers' view of intruding objects in an environment and that might block the light from a laser scanner. Particularly, a laser measuring scanner 320 is mounted on an upper surface/portion of the chassis frame 312 such as midway between the front and rear wheel axis assemblies 330, 340 on or near the longitudinal axis of the chassis 310 (or about where passenger seats may be located in a vehicle corresponding with the skid 300). In some cases, there may also be additional scanners placed at the front and rear of the skid 300.

The wheel axis assemblies 330, 340 each include rollers, wheels, and/or bogies for mating with two spaced apart track rails (not shown in FIG. 3). To allow the skid 300 to be used with differing sized rails (e.g., differing diameter rails), each assembly 330, 340 may include adjustable wheel mechanisms as shown at 344 that can be adjusted to cause the wheels (or rollers or bogies) to abut or mate with rails of differing sizes. In this way, the skid 300 is suited for use on a variety of ride tracks.

Further, the track gauge (or width between rails) may vary, and the test skid may be adapted such that it has an adjustable track gauge or width between adjustable wheel mechanisms 344 (and their wheels/roller/bogies). To this end, the skid 300 is shown to include a wheel width or track gauge adjustment mechanism 342 that is configured to allow the wheel mechanisms 344 to be slid toward or away from each other on the chassis 310 so as to set chassis width or to set the gauge of track that the skid can be used for testing. Similarly, the test skid 300 is adapted for length adjustment of the chassis 310 or its frame 312 with a set of wheelbase length adjustment mechanisms 314 so as to allow the wheelbase length to be changed to match a particular ride vehicle that is being replaced/simulated by the skid 300. This is useful because differing length vehicles that ride on the same track often will have differing reach clearance envelopes or envelope locations as the vehicles move along the track and chord or move differently due to the differing wheelbase lengths.

As discussed above, it is desirable for the test skid 300 to be designed to provide the same degrees of freedom as the actual ride vehicle and to provide such movement freedom (such as roll, pitch, and yaw) at the same locations on the chassis 310. Further, it is desirable to collect data about the movement of the chassis 310 at these points so as to gather track geometry data used by the test controller to determine the track geometry at each point along a track, which facilitates placement of the virtual reach envelope. To this end, the skid 300 is shown to include three DOF mechanisms 350, 360, and 370 that allow the chassis 310 or its components (such as wheel axis assembly 340) to move with roll, pitch, and yaw. Further, the skid 300 includes sensors 354, 364, 374 proximate to or associated with each of these DOF mechanisms 350, 360, 370 to sense the amount of movement of the chassis 310 with regard to each of these degrees of freedom (e.g., how much yaw?). As discussed with regard to system 100, the DOF sensors 354, 364, 374 transmit sensed data to the test controller in real time for use in envelope intrusion examination.

Figure 4:
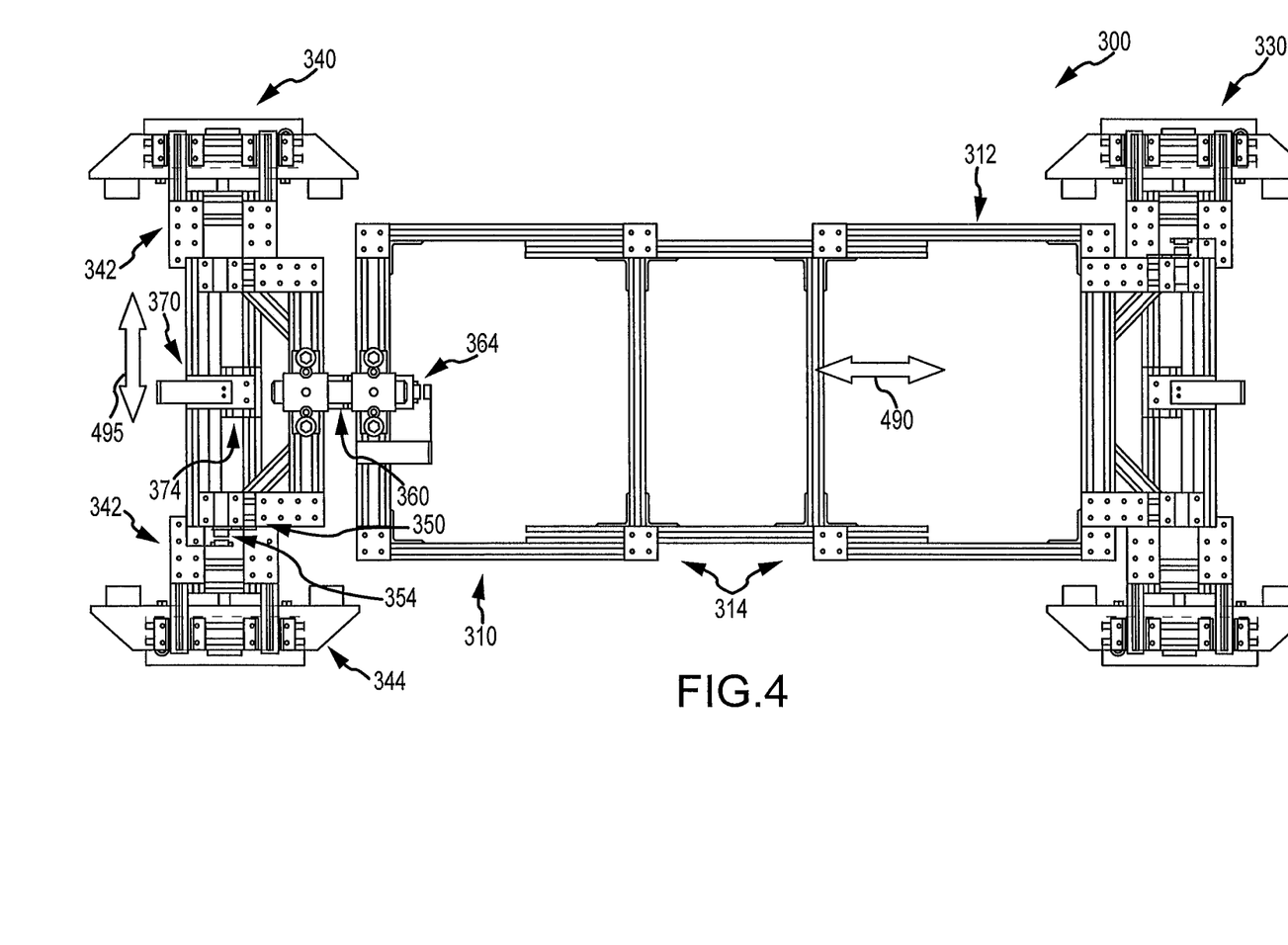
FIG. 4 is a top view of the test skid of FIG. 3, with the laser measuring scanner removed, showing wheelbase adjustability and track gauge adjustability due to the configuration of the chassis and wheel/rail mating assemblies.

FIG. 4 illustrates a top view of the test skid 300 showing the adjustability aspect of the skid design in more detail. As shown, the wheelbase length adjustment mechanisms 314 can be operated to allow the wheelbase length to be adjusted as shown at 490 (either lengthened or shortened). In this way, the wheelbase length of the skid 300 can be set to match that of an actual ride vehicle whose movements on a track are to be simulated by the test skid 300. For example, the mechanisms 314 may allow end frame elements or rods to slide relative to a central frame element or portion (which may be used to support the laser measuring scanner not shown in FIG. 4). This may simply involve loosening one or more fastener at each mechanism 314, sliding the two end frame elements together or apart to set the wheelbase length, and then tightening the fasteners again.

Further, as shown, the track gauge adjustment mechanisms 342 may allow the wheel assemblies 344 to slide toward each other (for a narrow track gauge) or to slide away from each other along the wheel axes (for a greater track gauge). The mechanisms 342 may be designed to allow frame elements/rods to selectively (whether fasteners are tight or loose) slide relative to each other or relative to a joining element. With the adjustability mechanisms 314, 342, the test skid 300 can readily be modified to be compatible with multiple ride tracks (e.g., multiple coaster tracks or the like).

Figure 5:
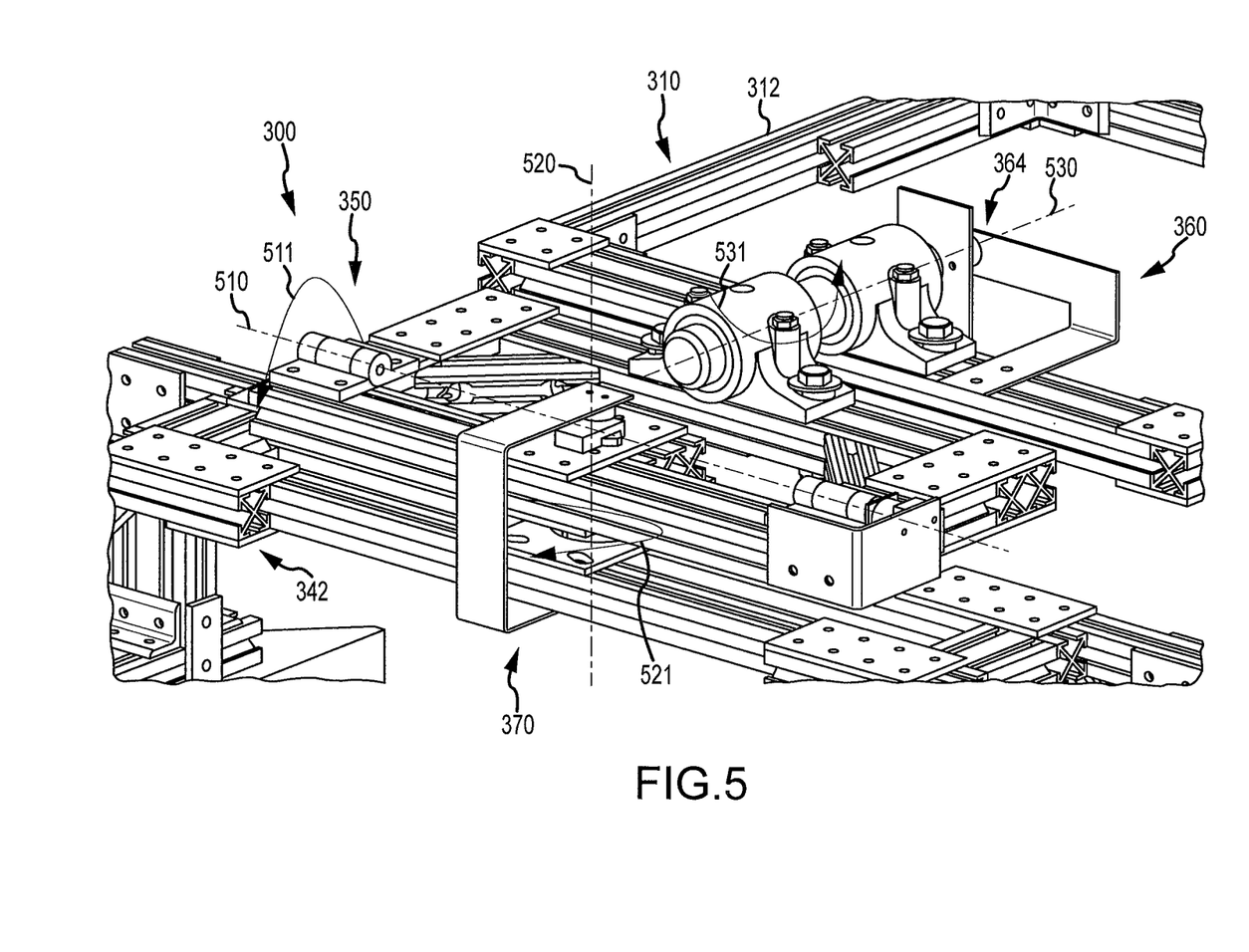
FIG. 5 is an enlarged partial view of the test skid of FIGS. 3 and 4 showing more detail of components of the chassis and of one wheel assembly adapted to provide three axes of rotation or degrees of freedom at locations matching those of a ride vehicle (which the skid is used to replace for envelope intrusion examination)

FIG. 5 is an enlarged view of the skid 300 showing further details of exemplary implementations of the DOF mechanisms 350, 360, 370 that may be used to provide movement of a chassis in roll, pitch, and yaw. Particularly, DOF mechanism 350 is shown to include a pair of hinges that allow the wheel axis assembly 340 to pivot 511 about an axis (transverse to the longitudinal axis of the chassis 310). DOF mechanism 360 includes a rotating shaft that rotates 531 about a longitudinal axis parallel to the longitudinal axis of the chassis 310 so that the wheel axis assembly 340 may rotate 531 relative to the chassis 310 or its frame 312. The DOF mechanism 370 includes a turntable that allows the wheel axis assembly 340 to rotate 521 about another axis 520 that extends through the wheel axis assembly 340 and that is transverse to both the longitudinal axis of the chassis 310 and to the axis 510 passing through hinges of DOF mechanism 350. The locations of the DOF mechanisms 350, 360, 370 and the type/amount of movement provided by these devices may be selected to match those of the actual ride vehicle that the skid 300 is replacing for envelope intrusion examination.

Figure 6:
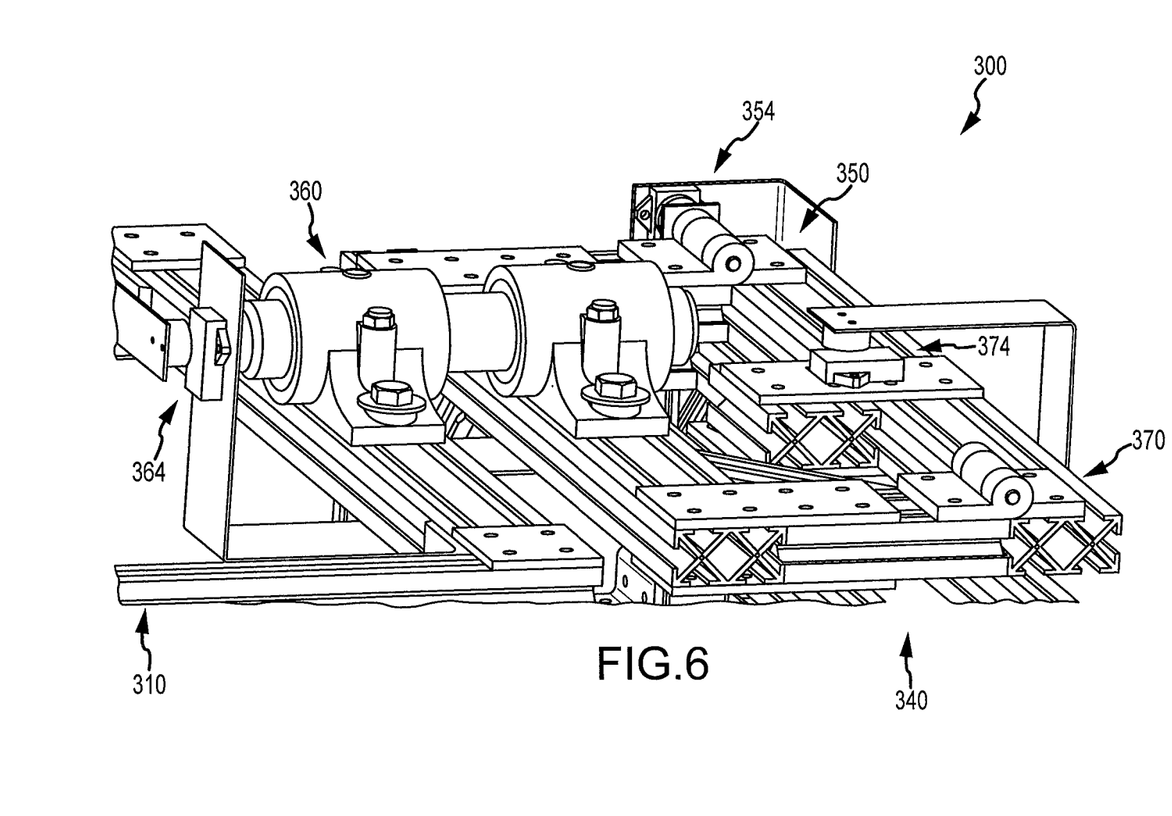
FIG. 6 illustrates a view of the test skid similar to that of FIG. 5 but selected to illustrate the sensors used to measure movement of the chassis relative to the degrees of freedom so as to measure/determine track geometry (e.g., geometry of the track currently supporting the test skid during envelope intrusion examination)

FIG. 6 illustrates an enlarged view of a portion of the test skid 300 showing further details on the sensors that are mounted on the skid 300 and that are used to collect track geometry data (e.g., to allow the test controller to measure track geometry based on skid chassis movements on the track). As shown, a scanner 354 is paired with DOF mechanism 350 to determine the amount of rotation about the axis of the hinges. A second scanner 364 is paired with DOF mechanism 360 to determine or measure the amount of rotation of the shaft about its longitudinal axis, and third scanner 374 is paired with DOF mechanism 370 to determine or measure the amount of rotation of the turntable about its central axis.

Figure 7A:
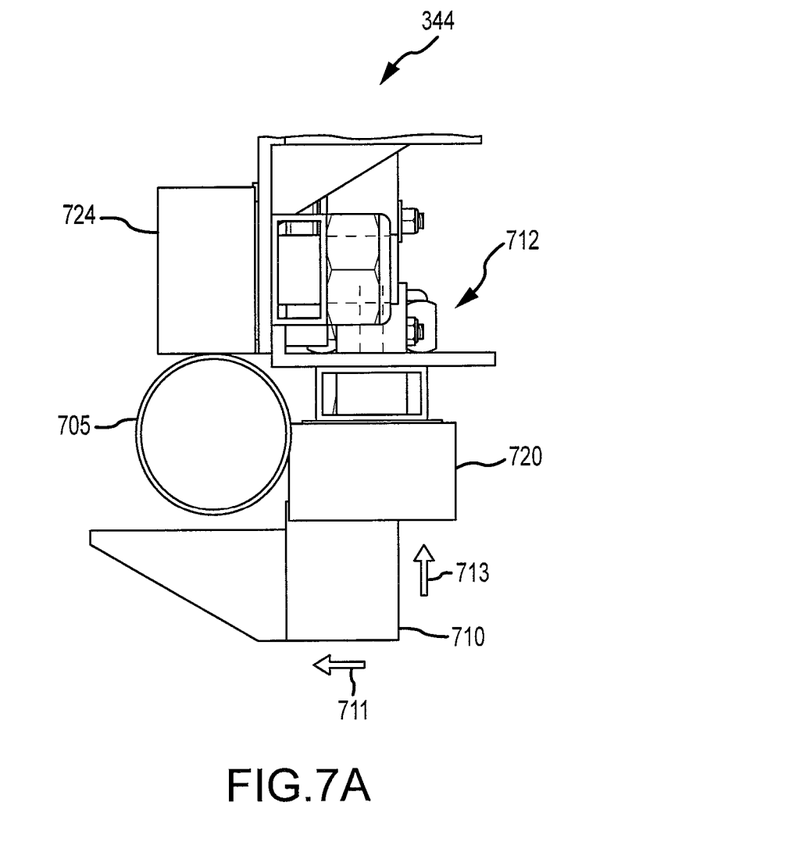
FIGS. 7A and 7B are enlarged end views of portions of a wheel assembly of the skid of FIGS. 3-6 showing the wheel assembly in a first configuration/operating state suited for a first, smaller diameter track rail and in a second configuration/operating state suited for allowing the skid to be used to ride on a second, larger diameter track rail (e.g., these figures illustrate track rail size adjustability of the test skid of the present description)
Figure 7B:
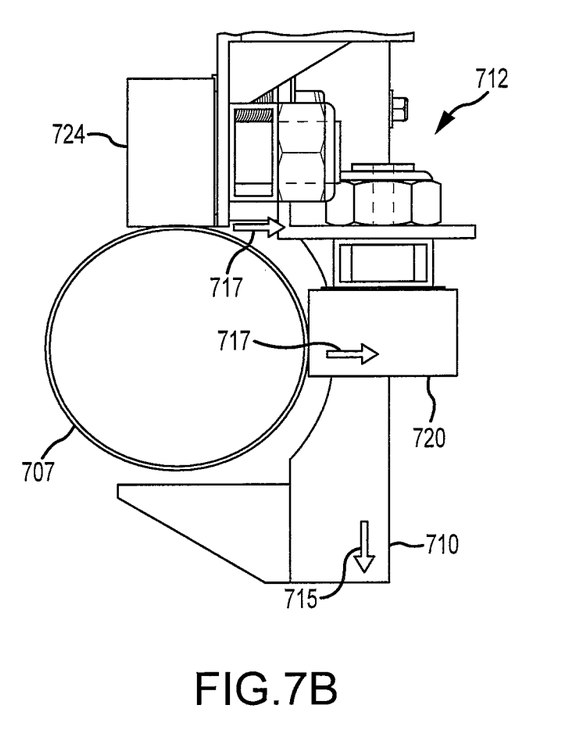

FIGS. 7A and 7B illustrate detailed end views of the adjustable wheel mechanisms 344 in first and second states allowing the test skid to be used with track rails 705, 707 having a first, smaller rail diameter and a second, larger rail diameter, respectively. As shown, a first wheel/roller 724 is attached to a frame assembly 712 and a second wheel/roller 720 is attached to an arm 710 extending out from the frame assembly 712.

To use the wheel mechanism 344 with a first, smaller rail 705 as shown in FIG. 7A, the frame assembly 712 is operated (nuts/fasteners loosened and then tightened) to move the arm 710 and wheel 720 both up towards the first wheel 724 (shown with arrow 713) and also inward toward the rail 705 (as shown with arrow 711) (e.g., the rotation axis of wheel 720 is moved along the rotation axis of the wheel 724 to be closer to passing through the wheel 724). In the illustrated configuration, the two wheels/rollers 720, 724 abut or contact the outer surfaces of the first, smaller diameter rail 705. To use the wheel mechanism 344 with a second, larger diameter rail 707 as shown in FIG. 7B, the frame assembly 712 is operated to move the arm 710 and wheel 720 both downwards away from the first wheel 724 (shown with arrow 715) and also outward away from the rail 707 (as shown with arrows 717) (e.g., the rotation axis of wheel 720 is moved along the rotation axis of the wheel to be farther away from the wheel 724).

Figure 8:
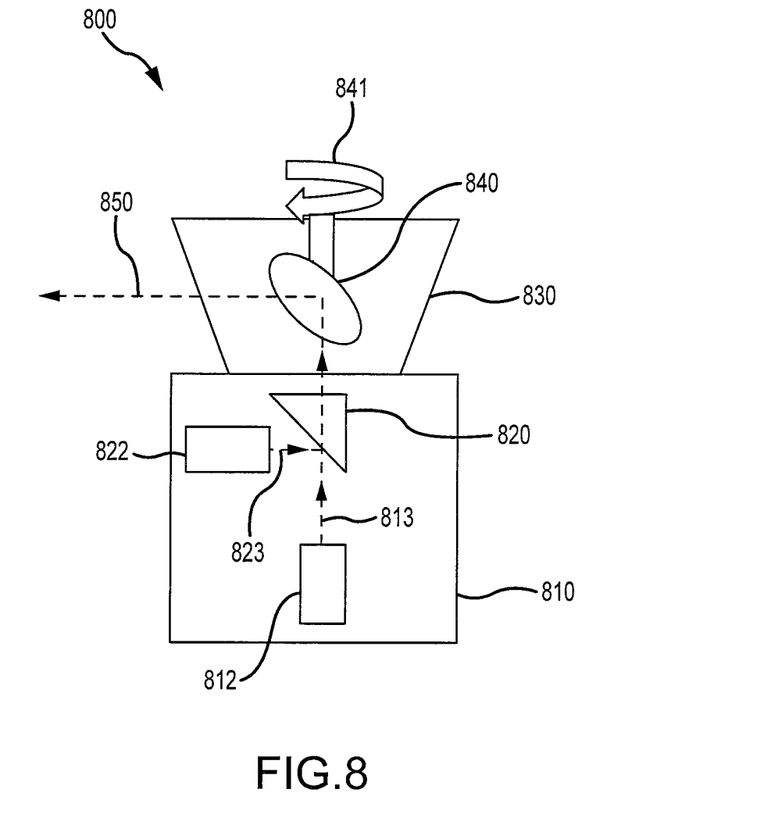
FIG. 8 is a schematic side view of an embodiment of a laser measuring and intrusion identification assembly that may be used in an envelope intrusion examination system of the present description.

As discussed with regard to system 100 of FIG. 1, the test controller 130 may operate a laser indicator or other lighting device 146 to mark or trace surfaces of objects that are determined to intrude into a reach envelope. FIG. 8 illustrates a schematic of a laser-based scanner and identification device 800. The inventor recognized that the laser measuring scanner 116 of system 100 of FIG. 1 can be effectively combined with the laser indicator 146 to provide very accurate marking or illumination of intruding surfaces. To this end, the device 800 integrates the visible laser identifying function with the laser-based measuring function.

As shown, the device 800 includes a first housing 810 and a second housing 830 that is fabricated to be translucent as well as being protective of contained components. The first housing 810 is used to support and position a non-visible laser 812 that is operated to emit non-visible laser light 813 that strikes a beam splitter prism 820. The light 813 then strikes a rotary mirror 840 that is rotated 841 so as to scan a plane (or about 180 to 270 degrees of such a plane) with output laser light 850 as the mirror 840 rotes 841 back and forth in rapid fashion. The rotary mirror 840 includes a position encoder that provides rotation (location of laser 850) information that can be used to map measured distances to points about the scanned plane (e.g., determine where each distance to a surround physical environment was measured by the device 800).

Further, the device 800 includes a visible laser 822 with pulsing capability. When an intrusion is identified, the test controller may operate the device 800 to use the visible laser 822 to emit visible laser light 823 that strikes the beam splitter prism 820 and then the rotary mirror 840 prior to being emitted as visible light output 850. The timing of the operation of the visible laser 822 is tracked or matched to the positions provided by the position encoder of the rotary mirror 840 where the non-visible laser light 813 in output 850 detected an intruding surface. In this way, the visible laser 822 can be used to trace exactly surfaces corresponding to measured intrusions with the visible and non-visible output laser light 850 being provided in the same plane.

Figure 9:
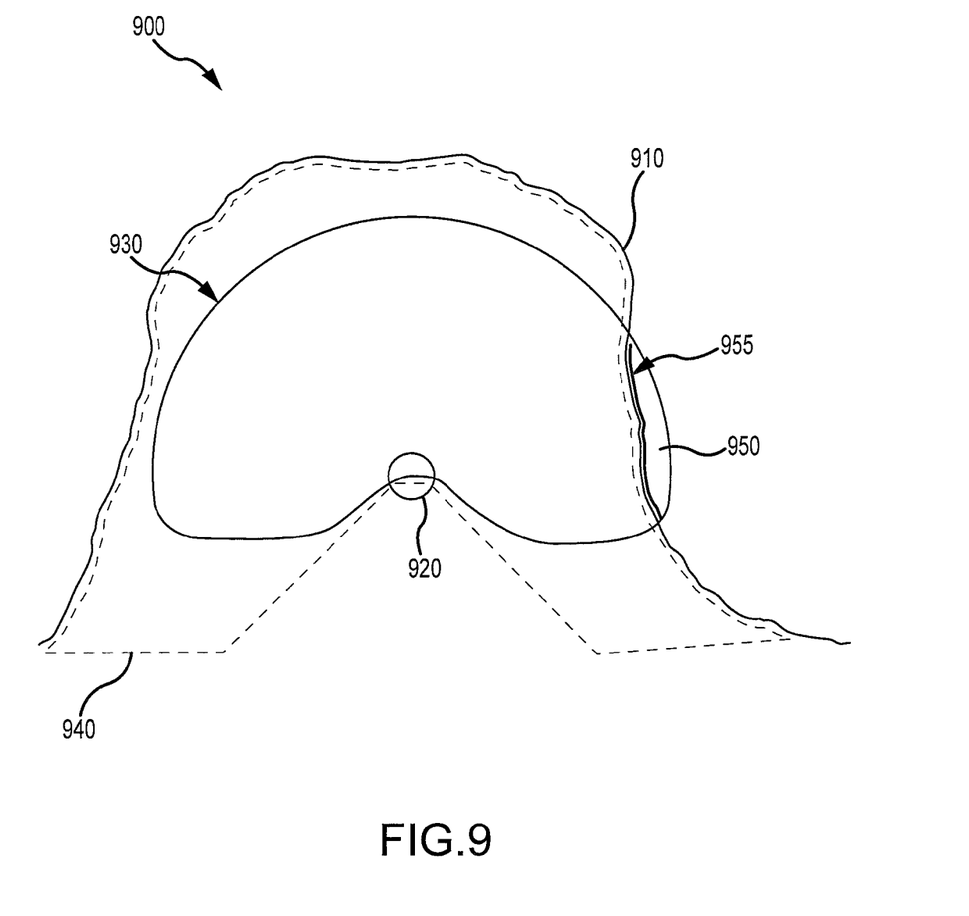
FIG. 9 is a simplified diagram (e.g., only showing the laser measuring and intrusion identification assembly of FIG. 8 and not the test skid that would support such an assembly) showing use of a test skid to measure a real world envelope and a laser-based intrusion identification mechanism to identify the intrusion into a virtual clearance envelope.

Use of the device 800 in a system such as system 100 of FIG. 1 is illustrated with the diagram 900 of FIG. 9. A laser device 920 (such as device 800) may be mounted on a test skid and moved along a ride track such that the skid and the laser device 920 pass through a physical environment 910. The laser measuring scanner portion of device 920 is operated to determine a real world envelope (by providing measured distances to an examination program on a test controller or the like) with an outer boundary shown by dashed line 940, which generally corresponds with the inward facing surfaces of the objects of the surrounding physical environment 910.

The test controller acts to compare these real world distances 940 with a virtual clearance envelope area 930 defined based on user input for the ride/attraction at this location along the ride track. An intrusion 950 is identified by the test controller in this illustrated example where a portion of the physical environment (e.g., a tunnel wall) extends a distance into the envelope 930. Then, as shown, the laser identification portion of the laser device 920 is used to visibly paint or trace as shown at 955 only the inward facing surface (a line on such surface where the vertical plane being scanned intersects the intruding object) of the intruding object 950. The skid and laser device may be held in place while the intrusion 950 is removed or physically marked in another manner for later removal or modification. The rotary mirror 920 is rotating rapidly during the tracing 955 but the visible laser is pulsed on only when the position encoder indicates the mirror is in a location corresponding to a detected intrusion 950.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. For example, the system 900 shown in FIG. 9 is a variant with one scanner. There may be other variants or embodiments with multiple scanners. Particularly, the skid 300 of FIG. 3 may be modified to include multiple scanners on the skid that work together to create multiple scan planes (e.g., front, middle, rear, and/or the like). Additional beams/linear supports may be provided on the "upper surface" of the skid 300 to align the scanners and place them in a single plane (in some embodiments). Such support beams would also be used to inhibit relative motion between the scanners just as passengers of a ride vehicle do not move (to any large extent) relative to each other while on the ride.

I claim:

1. A system for examining intrusions of a physical environment into a reach envelope of a vehicle traveling along a length of track, comprising:

a test skid comprising a chassis with front and rear wheel assemblies each adapted for rollably engaging the track, wherein the test skid further includes a laser measuring scanner supported on a surface of the chassis and adapted for scanning a plane orthogonal to a longitudinal axis of the chassis to measure a plurality of distances between the laser measuring scanner and surfaces of the physical environment when the test skid is moved along the track; and a test controller executing an examination program determining a real world environment based on the measured distances from a laser measuring scanner and determining intrusions by comparing a reach envelope for the vehicle with the determined real world environment, wherein the test skid further includes degrees of freedom mechanisms on the chassis providing yaw, roll, and pitch movements of the chassis as the test skid moves along the length of the track, wherein the test skid further includes a sensor associated with each of the degrees of freedom mechanisms measuring amounts of the yaw, roll, and pitch movements, wherein the examination program determines geometry of the track based on the measured amounts of yaw, pitch, and roll movements, and wherein the examination program generates the location of the reach envelope based on the determined track geometry and on vehicle geometry.

2. The system of claim 1, wherein the examination program generates a location and size of the reach envelope based on a reach envelope definition and on data defining geometry of the vehicle including locations of passenger seats.

3. The system of claim 1, wherein the degrees of freedom mechanisms are positioned on the chassis at locations corresponding to locations on the vehicle that provide yaw, roll, and pitch movements for the vehicle.

4. The system of claim 1, wherein the test skid further includes a track gauge adjustment mechanism for adjusting a width between wheel assemblies on the chassis.

5. The system of claim 1, wherein the test skid further includes a mechanism for adjusting a length of the chassis to set a wheelbase length for the test skid within a range of lengths.

6. The system of claim 1, wherein the front and rear wheel assemblies are configured for adjusting relative position between first and second wheels to adjust a track diameter receivable by the wheel assemblies.

7. The system of claim 1, wherein the laser measuring scanner further comprises a visible light laser and wherein the examination program operates the visible light laser selectively during scanning by the laser measuring scanner to trace a location of the intrusions in the physical environment with visible laser light.

8. A method for examining physical intrusions into reach clearance envelopes, comprising:

moving a test skid, supporting a laser measuring scanner, along a length of a ride path;

during the moving of the test skid, operating the laser measuring scanner to perform a vertical scan to determine distances to objects adjacent the test skid; and at a plurality of locations along the length of the ride path, comparing the determined distances of the objects with a reach clearance envelope definition at the corresponding one of the locations to determine a subset of the objects each with an intruding portion within the reach clearance envelope, wherein the comparing step further comprises comparing the determined distances of the objects with at least one additional reach clearance envelope definition and wherein the method further comprises providing output indicating which of the reach clearance envelope definitions correspond with the intruding portions of the subset of the objects.

9. The method of claim 8, concurrently with the operating of the laser measuring scanner, transmitting signals from sensors on the test skid sensing yaw, roll, and pitch of the test skid along the length of the ride path, the method further comprising determining a location of a reach clearance envelope based on the reach clearance envelope definition and a ride path geometry determined based on the signals from the sensors.

10. The method of claim 9, wherein the determining of the location of the reach clearance envelope further involves processing data defining geometry of a vehicle, whereby the reach clearance envelope is positioned relative to the vehicle geometry and the ride path geometry at each of the locations along the length of the ride path.

11. The method of claim 8, further comprising tracing the intruding portions of the subset of the objects with visible light to provide a visual indicator of a location of intrusions.

12. The method of claim 11, wherein the tracing of the intruding portions comprises selectively operating a visible light laser provided in the laser measuring scanner.

* * * * *